(12) United States Patent
Anderson et al.

(10) Patent No.: US 8,328,968 B2
(45) Date of Patent: Dec. 11, 2012

(54) MICROPOROUS COMPOSITE SHEET MATERIAL

(75) Inventors: Gary W. Anderson, Mt. Juliet, TN (US); Susannah D. Gelotte, Mauldin, SC (US)

(73) Assignee: Fiberweb, Inc., Old Hickory, TN (US)

( * ) Notice: Subject to any disclaimer, the term of this patent is extended or adjusted under 35 U.S.C. 154(b) by 0 days.

(21) Appl. No.: 13/447,898

(22) Filed: Apr. 16, 2012

(65) Prior Publication Data

US 2012/0211915 A1    Aug. 23, 2012

Related U.S. Application Data

(60) Division of application No. 13/111,186, filed on May 19, 2011, now Pat. No. 8,222,164, which is a continuation of application No. 10/386,004, filed on Mar. 11, 2003, now Pat. No. 7,972,981.

(60) Provisional application No. 60/364,508, filed on Mar. 15, 2002.

(51) Int. Cl.
*B29C 47/00* (2006.01)
*B29C 41/24* (2006.01)
*D06C 5/00* (2006.01)

(52) U.S. Cl. ...... 156/60; 156/166; 156/229; 156/244.11; 427/171; 427/172; 427/173; 427/176; 264/165; 264/173.15; 264/280; 264/288.4; 264/291

(58) Field of Classification Search ............... 442/62, 442/76, 77, 85, 164; 156/60, 166, 229, 244.11; 427/171, 172, 173, 176; 264/165, 173.15, 264/280, 288.4, 291
See application file for complete search history.

(56) References Cited

U.S. PATENT DOCUMENTS

| | | |
|---|---|---|
| 3,338,992 A | 8/1967 | Kinney |
| 4,116,892 A | 9/1978 | Schwarz |
| 4,153,664 A | 5/1979 | Sabee |
| 4,153,751 A | 5/1979 | Schwarz |
| 4,285,100 A | 8/1981 | Schwarz |
| 4,582,750 A | 4/1986 | Lou et al. |
| 4,684,568 A | 8/1987 | Lou |
| 4,857,393 A | 8/1989 | Kato et al. |
| 4,898,761 A | 2/1990 | Dunaway et al. |
| 4,929,303 A | 5/1990 | Sheth |
| 4,974,382 A | 12/1990 | Avellanet |
| 5,169,712 A | 12/1992 | Tapp |
| 5,208,098 A | 5/1993 | Stover |
| 5,368,920 A | 11/1994 | Schortmann |
| 5,382,461 A | 1/1995 | Wu |
| 5,422,172 A | 6/1995 | Wu |
| 5,656,167 A | 8/1997 | Martz |
| 5,683,787 A | 11/1997 | Boich et al. |

(Continued)

FOREIGN PATENT DOCUMENTS

EP    0 127 483 A2    12/1984

(Continued)

*Primary Examiner* — Matthew D. Matzek
(74) *Attorney, Agent, or Firm* — Meunier Carlin & Curfman, LLC

(57) ABSTRACT

Disclosed herein are methods of preparing a composite sheet material having strength and barrier properties suitable for use as a housewrap, the methods comprising extrusion coating a polyolefin film layer onto a surface of an area-bonded, spunbond nonwoven substrate to form a composite sheet material, the composite sheet material having a grab tensile strength of at least 178 Newtons in at least one of the machine direction (MD) or the cross-machine direction (CD), and stretching the composite sheet material to impart to the composite sheet material a hydrostatic head of at least 100 cm, and a moisture vapor transmission rate (MVTR) of at least 35 g/m$^2$/24 hr at 50% relative humidity and 23° C.

8 Claims, 2 Drawing Sheets

U.S. PATENT DOCUMENTS

| | | |
|---|---|---|
| 5,733,824 A | 3/1998 | Brunka et al. |
| 5,750,151 A | 5/1998 | Brignola et al. |
| 5,773,123 A | 6/1998 | Anwyll, Jr. |
| 5,865,926 A | 2/1999 | Wu et al. |
| 5,888,614 A | 3/1999 | Slocum et al. |
| 5,919,177 A | 7/1999 | Georger et al. |
| 6,013,151 A | 1/2000 | Wu et al. |
| 6,046,118 A | 4/2000 | Jones et al. |
| 6,071,834 A | 6/2000 | Martz |
| 6,100,208 A | 8/2000 | Brown et al. |
| 6,133,168 A | 10/2000 | Doyle et al. |
| 6,187,696 B1 | 2/2001 | Lim et al. |
| H1955 H | 4/2001 | Middlesworth et al. |
| 6,235,658 B1 | 5/2001 | Panzer et al. |
| 6,258,308 B1 | 7/2001 | Brady et al. |
| 6,300,257 B1 | 10/2001 | Kirchberger et al. |
| 6,506,695 B2 | 1/2003 | Gardner et al. |
| 2002/0055316 A1 | 5/2002 | Araida et al. |
| 2002/0071944 A1 | 6/2002 | Gardner et al. |
| 2002/0132547 A1 | 9/2002 | Grondin et al. |
| 2004/0023585 A1 | 2/2004 | Carroll et al. |
| 2005/0014431 A1 | 1/2005 | Carmody et al. |

FOREIGN PATENT DOCUMENTS

| | | |
|---|---|---|
| EP | 0 685 586 A2 | 12/1995 |
| WO | 97/29909 A1 | 8/1997 |

MICROPOROUS COMPOSITE SHEET MATERIAL

CROSS-REFERENCE TO RELATED APPLICATION

This application is a division of U.S. patent application Ser. No. 13/111,186 filed May 19, 2011, which is a continuation of U.S. patent application Ser. No. 10/386,004 filed Mar. 11, 2003, which issued as U.S. Pat. No. 7,972,981 on Jul. 5, 2001 and which claims priority from U.S. Provisional Patent Application No. 60/364,508 filed Mar. 15, 2002, incorporated herein by reference in its entirety, and claims the benefit of its earlier filing date under 35 U.S.C. 119(e).

BACKGROUND OF THE INVENTION

This invention relates to a microporous composite sheet material. More particularly, the invention relates to a composite sheet material which is permeable to moisture vapor but which forms a barrier to the passage of water. The composite sheet material has strength and barrier properties which make it suitable for use as a housewrap.

Various types of sheet materials have been used in the construction of buildings as a barrier fabric to block water and air while allowing transmission of moisture vapor from the building interior. These so-called housewrap products are typically applied over the sheathing layer of the building and beneath the exterior surface layer of brick or siding. During the time that the building is under construction, the housewrap material is exposed to the elements for a considerable period of time. Therefore, the fabric must have good weatherability, relatively high tear strength and puncture resistance. The fabric must also maintain the strength and barrier properties while it is exposed to the elements, and subsequently during the lifetime of the building.

Various types of fabrics have been produced and sold commercially for use as a barrier fabric in building construction. One such commercially available product is manufactured and sold by DuPont under the trademark Tyvek® Homewrap®. This product is formed from flash spun high-density polyethylene fibers which are bonded together to form a nonwoven sheet material.

Other commercially available housewrap products have been developed which utilize preformed microporous films laminated to a reinforcing substrate, as described for example in Sheth U.S. Pat. No. 4,929,303 or Martz U.S. Pat. Nos. 5,656,167 and 6,071,834.

Still other commercially available housewrap products have used a woven or nonwoven substrate with a perforated film coating. For example, in Dunaway et al, U.S. Pat. No. 4,898,761, a barrier fabric is disclosed in which a polymer film is laminated to a nonwoven fabric, and the resulting composite sheet material is then needle-punched to provide micropores through the film. The nonwoven fabric is a spunbonded web formed of poly-olefin filaments, and the polymer film can be applied to the nonwoven web by hot cast extrusion.

The currently available house-wrap materials have various deficiencies. Many of the commercially available housewrap materials can be easily torn when installed during construction or punctured by ladders or scaffolding leaning against the building. These materials are also susceptible to being torn by the wind during construction while the housewrap material remains exposed. Housewrap materials formed from laminates of a microporous film with a supporting substrate require a two-step process which increases the expense, and the resultant products suffer from low puncture strength and generally low overall tear and tensile strength.

The need exists for an economical barrier material with superior strength and tear resistance, as well as excellent water and air barrier properties.

SUMMARY OF THE INVENTION

The present invention provides a moisture vapor permeable, water impermeable composite sheet material having superior strength and barrier properties. The composite sheet material is suitable for use as a housewrap material, and is also useful for other applications such as tarpaulins, or as covers for automobile, boats, patio furniture or the like. The composite sheet material includes a nonwoven substrate and an extrusion-coated polyolefin film layer overlying one surface of the substrate. The nonwoven substrate is comprised of polymeric fibers randomly disposed and bonded to one another to form a high tenacity nonwoven web. The nonwoven substrate has a grab tensile strength of at least 178 N (40 pounds) in at least one of the machine direction (MD) or the cross-machine direction (CD). The extrusion coated polyolefin film layer is intimately bonded to the nonwoven substrate. The film layer has micropores formed therein to impart to the composite sheet material a moisture vapor transmission rate (MVTR) of at least 35 $g/m^2/24$ hr. at 50% relative humidity (RH) and 23° C. (73° F.) and a hydrostatic head of at least 55 cm.

In one embodiment, the nonwoven substrate comprises a spunbonded nonwoven fabric formed of randomly disposed substantially continuous polypropylene filaments. The spunbonded nonwoven fabric is an area bonded fabric in which the filaments are bonded to one another throughout the fabric at locations where the randomly disposed filaments overlie or cross one another.

The film layer is intimately bonded to the substrate to preferably provide a peel adhesion of at least 59 g/cm (150 grams per inch). The film layer suitably comprises a polyolefin polymer and at least 40% by weight of an inorganic filler such as calcium carbonate. The film layer preferably has a basis weight of at least 25 grams per square meter. The composite sheet material has been stretched in at least one of the machine direction or the cross machine direction. This stretching operation renders the composite sheet material microporous. The composite sheet material has a moisture vapor transmission rate (MVTR) of at least 35 $g/m^2/24$ hours at 50% relative humidity and 23° C. (73° F.). The composite sheet material also has a hydrostatic head of at least 55 cm, preferably at least 100 cm.

BRIEF DESCRIPTION OF THE DRAWINGS

Some of the features and advantages of the invention having been described, others will become apparent from the detailed description which follows, and from the accompanying drawings, in which—

DETAILED DESCRIPTION OF ILLUSTRATIVE EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure wilt be thorough and complete, and will fully convey the scope of the invention to those skilled in the art. Like numbers refer to like elements throughout.

Figure 1:
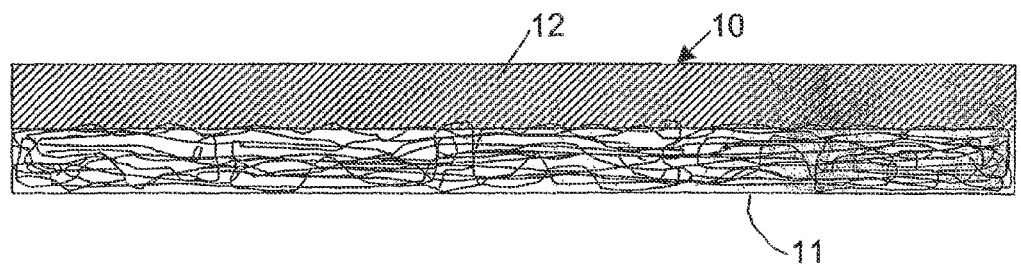
FIG. 1 is a schematic cross sectional view of the composite sheet material of the present invention.

In FIG. 1, the composite sheet material of the present invention is indicated generally by the reference character 10. The composite sheet material includes a nonwoven fibrous substrate 11 and a polyolefin film layer 12 extending uninterruptedly and continuously over one surface of the nonwoven fibrous substrate 11. The film layer 12 has a strong adherence to the nonwoven fibrous substrate 11, such that the film layer and the substrate are not subject to delamination but instead are structurally combined with one another to form a composite material. The peel adhesion of the film layer 12 to the nonwoven fibrous substrate 11 is at least 59 g/cm (150 grams/inch), and preferably at least 78 g/cm (200 grams/inch). Most desirably, the adhesion is so great that the fibers of the substrate wilt tear or break before delamination will occur. This condition, known as "fiber tear," occurs above about 98 g/cm (250 grams/inch). Adhesion of the film to the substrate is measured in accordance with the test procedure described below under the section entitled "Test Methods."

The nonwoven fibrous substrate 11 is a high tenacity nonwoven fabric formed from polymeric fibers which are randomly disposed and bonded to one another to form a strong nonwoven web. It is important for the substrate to have high tenacity and relatively low elongation in order to provide the strength and other physical properties required for a barrier material such as a housewrap. Preferably, the nonwoven substrate 11 has a grab tensile strength of at least 178 Newtons (40 pounds) in at least one of the machine direction (MD) or the cross-machine direction (CD). More preferably, the nonwoven substrate has a grab tensile strength of at least 267 N (60 pounds) in at least one of the MD and the CD. The required high tenacity and low elongation are achieved by selection of a manufacturing process in which the polymer fibers of the nonwoven fabric are drawn to achieve a high degree of molecular orientation, which increases fiber tenacity and lowers fiber elongation. Preferably, the manufacturing process involves mechanically drawing the fibers by means of draw rolls, as distinguished from other well-known manufacturing processes for nonwovens which utilize pneumatic jets or slot-draw attenuators for attenuating the freshly extruded fibers. Pneumatic attenuation of the fibers via jets or attenuators can not achieve the high spinline stress required for orienting the polymer molecules to a high degree to develop the full tensile strength capability of the fibers. Mechanically drawing the fibers, on the other hand, allows for higher stresses in the fiber to orient the polymer molecules in the fibers and thereby strengthen the fibers. The drawing is carried out below the melting temperature of the polymer, after the polymer has cooled and solidified. This type of drawing process is conventionally referred to as "cold-drawing" and the thus-produced fibers may be referred to as "cold-drawn" fibers. Because the fibers are drawn at a temperature well below the temperature at which the polymer solidifies, the mobility of the oriented polymer molecules is reduced so that the oriented polymer molecules of the fiber cannot relax, but instead retain a high degree of molecular orientation. The degree of molecular orientation of the fiber can be determined by measuring the birefringence of the fiber. Cold-drawn fibers of the type used in the present invention are characterized by having a higher birefringence than fibers attenuated by pneumatic jets or slot-draw attenuators. Consequently, the individual fiber tenacity of a cold-drawn fiber is significantly greater than that of a fiber which is attenuated or stretched by pneumatic jets or attenuators of the type used in some spunbond nonwoven manufacturing processes.

Cold-drawing of a fiber-forming polymer is characterized by a phenomenon known as "necking down". When the undrawn fiber is stretched, a reduction in diameter occurs in the fiber at a discrete location, i.e. "neck" instead of a gradual reduction in diameter. The morphology of a fiber drawn by cold-drawing is different from the morphology of a fiber which has been attenuated or stretched while still in the molten state where the polymer molecules are mobile. The differences are evident from the x-ray diffraction patterns, from birefringence measurements, and from other analytical measurements.

Also contributing to the required high strength and low elongation of the substrate is the method or mechanism by which the fibers are bonded. Preferably, the nonwoven substrate is "area bonded" as distinguished from a "point bonded" or "patterned bonded" sheet material. In a point bonded or pattern bonded fabric, discrete bond points or zones are separated from one another by unhanded areas or zones. This type of bonding is often utilized for applications in which it is desired to preserve the softness of the fabric, such as nonwoven fabrics for diapers or hygiene products for example. In an "area bonded" fabric, the fiber bonds are not separated by unbonded areas, but instead are found throughout the area of the fabric. Because of the larger number of fiber-to-fiber bonds, area bonded fabrics are typically stronger than a point bonded fabric and are also less soft and less flexible. The fibers are adhered or bonded to one another throughout the fabric at numerous locations where the randomly deposited fibers overlie or cross one another.

A preferred class of nonwoven substrate for use in the present invention is a spunbond nonwoven. Spunbond nonwoven fabrics are formed by extruding molten thermoplastic material as continuous filaments from a plurality of fine, usually circular capillaries of a spinneret. The filaments are drawn and then randomly deposited onto a collecting surface. The filaments are bonded to form a coherent web. One specific example of a commercially available nonwoven fabric possessing the required high levels of strength is a product sold under the trademark Typar® or Tekton® by Fiberweb Plc. This product is a spunbonded nonwoven fabric is made from fibers in the form of substantially continuous filaments of polypropylene. The filaments are mechanically cold-drawn and have a denier per filament of from 4 to 20. They preferably exhibit a fiber birefringence of at least 0.022. The fabric is area bonded, with the filaments being bonded to one another at their crossover points to form a nonwoven sheet material having excellent strength characteristics. The spunbonded nonwoven substrate preferably has a grab tensile strength in the machine direction (MD) of at least 267 N (60 lbs.) and in the cross machine direction (CD) of at least 178 N (40 lbs.). The fabric is manufactured generally in accordance with Kinney U.S. Pat. No. 3,338,992, using mechanical draw rolls as indicated in FIG. 16. An example of another suitable spunbonded nonwoven fabric is a product sold by Fiberweb Plc under the trademark Reemay®. This spunbonded nonwoven fabric is formed of filaments of polyester.

The thermoplastic polymer fibers or filaments of the substrate 11 preferably contain pigments as well as chemical stabilizers or additives for retarding oxidation and ultraviolet degradation, and for imparting other desired properties such as antimicrobial, antimold, or antifungal. Typically, the stabilizers and additives are incorporated in the polymer at conventional levels, e.g., on the order of about 0.5 to 2% by weight. Typical stabilizers may include primary antioxidants (including hindered amine-fight stabilizers and phenolic stabilizers), secondary antioxidants (such as phosphates), and ultraviolet absorbers (such as benzophenones). The polymer composition also preferably contains a pigment to render the nonwoven fabric opaque. In one preferred embodiment, the fibers are pigmented black using a black pigment, such as carbon black. If a white color is desired, titanium dioxide pigment can be used at comparable levels, or blends of titanium dioxide, with carbon black or with other colored pigments could be employed. The fibers or filaments are preferably circular in cross-section, although other cross-sectional configurations such as trilobal or multilobal cross-sections can be employed if desired.

The nonwoven fibrous substrate 11 should have a basis weight of at least 50 g/m$^2$, preferably from 60 to 140 g/m$^2$, and for certain preferred embodiments, a basis weight of from 80 to 110 g/m$^2$.

The composition from which the film layer 12 is formed is prepared by blending or compounding one or more thermoplastic polymers with suitable inorganic pore-forming filters and with suitable additives, stabilizers and antioxidants. The polymer composition includes at least one polyolefin polymer component, such as polypropylene, propylene copolymers, homopolymers or copolymers of ethylene, or blends of these polyolefins. The polymer composition may, for example, comprise 100% polypropylene homopolymer, or blends of polypropylene and polyethylene. Suitable polyethylenes include linear low density polyethylene (LLDPE). The polymer composition may also include minor proportions of other nonolefin polymers. The polymer composition is blended with an inorganic pore-forming filter. Preferably, the pore-forming filler has a particle size of no more than about 5 microns. Examples of inorganic fillers include calcium carbonate, clay, silica, kaolin, titanium dioxide, diatomaceous earth, or combinations of these materials. Calcium carbonate is particularly preferred as a pore-forming filler, and it is preferred that the calcium carbonate be treated with calcium stearate to render it hydrophobic and to prevent agglomeration or clumping.

To achieve the high level of MVTR required for the present invention, it is preferred that the polymer and pore-forming tiller blend comprise at least 40% by weight filler, and most desirably at least 50% by weight filler. The polymer composition may also include additional colorants or pigments, such as titanium dioxide, as well as conventional stabilizers and antioxidants, such UV stabilizers, hindered amine light stabilizer compounds, ultraviolet absorbers, antioxidants and antimicrobials.

The film-forming polymer composition is heated and mixed in an extruder, and is extruded from a slot die to form a molten polymer film. The molten polymer film is brought directly into contact with the nonwoven substrate 11 and the molten film composition is forced into intimate engagement with the fibrous web by directing the materials through a nip defined by a pair of cooperating rotating rolls.

Figure 2:
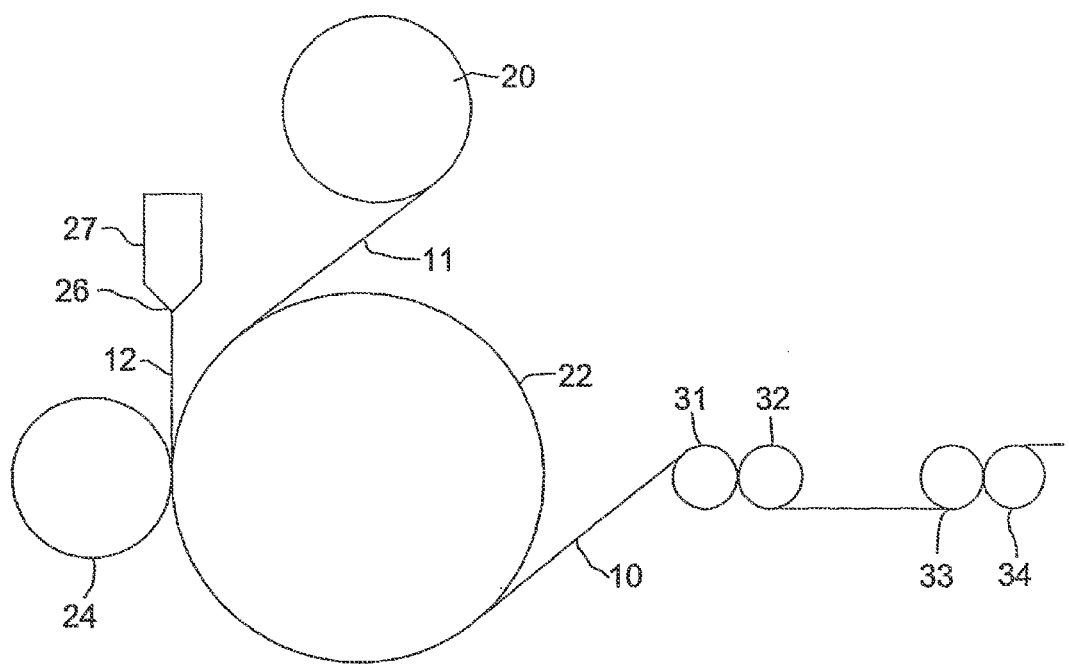
FIG. 2 is a schematic diagram showing equipment suitable for producing the composite sheet material of the present invention.

Suitable equipment for carrying out this process is shown schematically in FIG. 2. The nonwoven substrate 11 is unwound from a supply roll 20 and is directed onto and around a rotating chill roll 22. A cooperating pressure roll 24 defines a pressure nip with the chill roll 22. The polymer composition is extruded in the form of a film 12 of molten polymer from a slot die 26 of an extruder 27 directly into the nip defined between the cooperating rolls 22, 24. As the polymer film and the nonwoven substrate advance around the chill roll 22, the molten polymer composition cools and solidifies to form a substantially continuous polymer film layer adhered to one surface of the nonwoven substrate 11. At this point, the nonwoven web and film composite is substantially impermeable to moisture vapor. The composite is made microporous by stretching the material in the machine direction, or the cross-machine direction or in both the machine direction and the cross-machine direction. The fabric can be rolled-up and the stretching can be carried out in a separate subsequent operation, or alternatively, the stretching can be carried out in-line with the extrusion coating operation, as shown in FIG. 2.

Various stretching techniques can be employed to develop the micropores in the composite sheet material 10. A particularly preferred stretching method is a process known as "incremental stretching". In an incremental stretching operation, the sheet material is passed through one or more cooperating pairs of intermeshing grooved or corrugated rolls which cause the sheet material to be stretched along incremental zones or lines extending across the sheet material. The stretched zones are separated by zones of substantially unstretched or less stretched material. The incremental stretching can be carried out in the cross machine direction (CD) or the machine direction (MD) or both, depending upon the design and arrangement of the grooved rolls. Example of apparatus and methods for carrying out incremental stretching are described in U.S. Pat. Nos. 4,116,892; 4,153,751; 4,153,664; and 4,285,100, incorporated herein by reference.

FIG. 2 illustrates equipment suitable for a continuous in-line stretching operation using first and second pairs of intermeshing rolls. The first pair of intermeshing rolls 31, 32 is provided with a grooved surface configured for achieving incremental stretching in the cross-direction (CD) of the material. The grooves extend circumferentially around the rolls and produce a series of alternating stretched and non-stretched zones extending linearly along the machine direction of the composite material. The amount of incremental stretching is controlled by varying the engagement depth of the intermeshing rolls. The stretching operation is carried generally in accordance with the teachings of U.S. Pat. No. 5,865,926, the disclosure of which is incorporated herein by reference.

Preferably, the fabric is subjected to stretching in the machine direction as well as in the cross-direction. For this purpose, the fabric is run through a second set of rolls 33, 34 designed for achieving MD stretching. The second pair of intermeshing rolls 33, 34 have a grooved surface configured for achieving stretching in the machine direction (MD) of the material, with the grooves extending generally parallel to the rotational axis of the rolls. The additional stretching operation in the machine direction increases the moisture vapor transmission properties of the material and provides an aesthetically pleasing surface appearance.

The film layer is preferably applied to the fabric at a minimum basis weight of 25 g/m$^2$, and most desirably, from 30 to 50 g/m$^2$.

The resulting composite material has an overall basis weight of from 60 to 140 g/m$^2$ and a MVTR of at least 35 g/m$^2$/24 hr. at 50% relative humidity and 23° C. (73° F.), and more desirably a MVTR of at least 100. The product preferably also has a Gurley porosity of at least 400 seconds and a hydrostatic head of at least 55 cm.

The product also preferably has an Air Leakage Rate less than 0.02 L/(s·m²), and more desirably less than 0.015 L/(s·m²) measured by ASTM 283.

Figure 3:
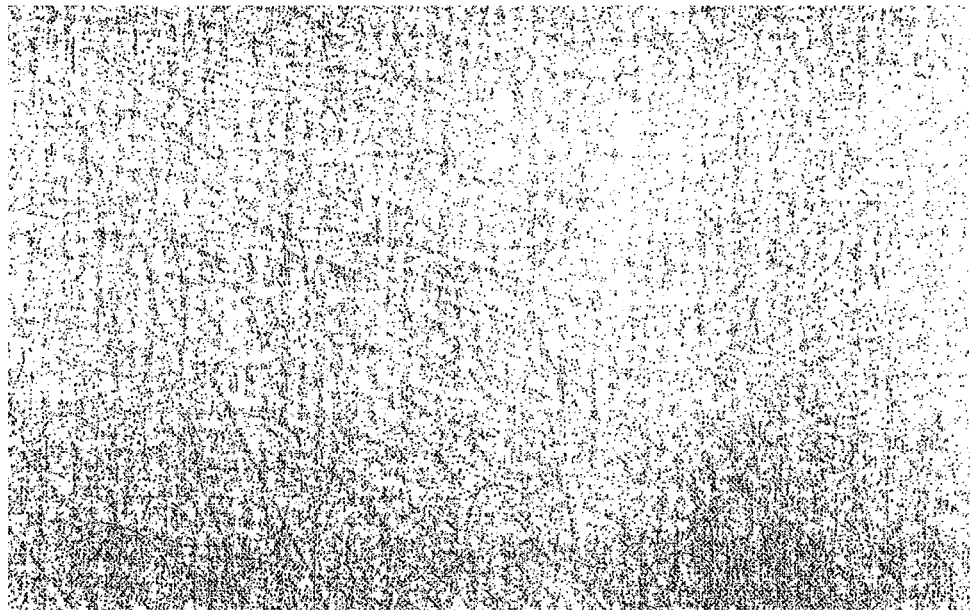
FIG. 3 is a view, at 1× magnification, showing the film-coated side of the composite sheet material.

FIG. 3 illustrates the film-coated surface of the composite nonwoven material of the present invention which has been incrementally stretched in both the machine direction (NM) and in the cross direction (CD) using grooved incremental stretching rolls. A faint pattern of discontinuous darker areas extending in both dimensions (horizontally and vertically) can be seen in this Figure. This pattern, somewhat resembling houndstooth-check pattern, is produced by the CD and MD incremental stretching operation. The random pattern of the filaments of the underlying nonwoven layer can also be seen in the fabric.

Figure 4:
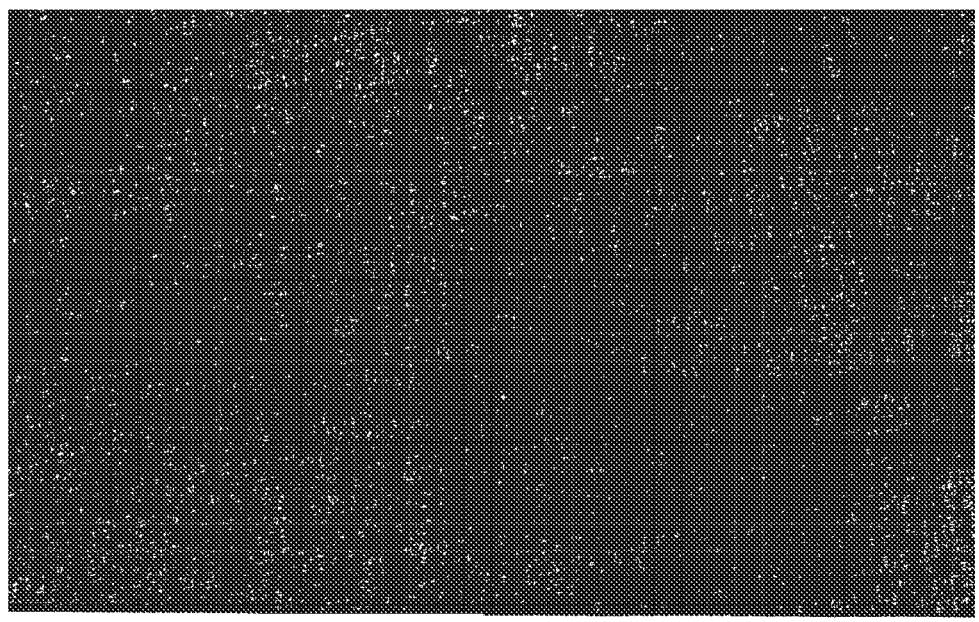
FIG. 4 is a view at the same magnification showing the nonwoven side of the composite sheet material.

FIG. 4 illustrates the opposite side of the fabric shown in FIG. 3. Here, the random pattern of the black-pigmented filaments of the spunbond nonwoven can be seen. The tighter areas are the underlying film layer.

Test Methods

In the description above and in the non-limiting examples that follow, the following test methods were employed to determine various reported characteristics and properties. ASTM refers to the American Society for Testing and Materials, AATCC refers to the American Association of Textile Chemists and Colorists, INDA refers to the Association of the Nonwovens Fabrics Industry, and TAPPI refers to the Technical Association of Pulp and Paper Industry.

Air Leakage Rate is measured by ASTM E283, entitled "Standard Test Method for Rate of Air Leakage Through Exterior Windows, Curtain Walls, and Doors." This is a standard for laboratory measurement of air leakage through buildings.

Basis Weight is a measure of the mass per unit area of a sheet and was determined by ASTM D-3776, which is hereby incorporated by reference, and is reported in g/m².

Fabric thickness is measured in accordance with ASTM D 1777—Standard Test Method for Thickness of Textile Materials (1996).

Fiber birefringence was determined by measuring the refractive index of the fiber using a polarizing microscope with a 587.3 nm interference filter for illumination of the samples, thus representing D-line refractive indices (nD). The refractive index was measured in directions parallel and perpendicular to the fiber, and birefringence was determined by the difference between these refractive indices.

Fiber Tenacity was determined according to ASTM D3822.

Grab Tensile Strength The grab tensile test is a measure of breaking strength of a fabric when subjected to unidirectional stress. This test is known carried out in accordance with ASTM D 4632—Standard Test Method for Grab Breaking Load and Elongation of Geotextiles, 1991 (reapproved 1996).

Gurley Porosity is a measure of the resistance of the sheet material to air permeability, and thus provides an indication of its effectiveness as an air barrier. It is measured in accordance with TAPPI T-460 (Gurley method). This test measures the time required for 100 cubic centimeters of air to be pushed through a one-inch diameter sample under a pressure of approximately 4.9 inches of water. The result is expressed in seconds and is frequently referred to as Gurley Seconds.

Hydrostatic Head (hydrohead) is a measure of the resistance of a sheet to penetration by liquid water under a static pressure. The test is conducted according to AATCC-127, which is hereby incorporated by reference, and is reported in centimeters.

Moisture Vapor Transmission Rate (MVTR) is determined by ASTM F 96, Standard Test Methods for Water Vapor Transmission of Materials; 1995, Procedure A.

Mullen burst strength is determined by ASTM D3786, Standard Test Method for Hydraulic Bursting Strength of Textile Fabrics—Diaphragm Bursting Strength Tester Method.

Peel adhesion. The adhesion of the film layer to the nonwoven substrate layer is measured by delaminating a portion of the film from the nonwoven substrate and measuring the force required to peel the film from the nonwoven. The peel adhesion is expressed in terms of gams of peel force per inch of width.

Tear Strength is measured in accordance with ASTM D 4533 (trapezoidal tear).

Tensile Elongation is measured in accordance with ASTM Method D882 for the high tenacity nonwoven substrates used in the present invention. For lighter basis weight nonwovens used in the hygiene industry, ASTM Method D 5035 is the accepted standard.

Example 1

Typar® 3201, a spunbonded polypropylene nonwoven fabric produced by Reemay, Inc. of Old Hickory, Tenn., was used as the fibrous nonwoven substrate for producing a high MVTR extrusion coated composite sheet material. Typar® 3201 is a spunbond polypropylene nonwoven fabric having a basis weight of 64 g/m², a thickness of 0.305 mm (12 mils), an MD gab tensile strength of 351 N (79 lbs.), a CD grab tensile strength of 329 N (74 lbs.), a trapezoidal tear strength of 165 N (37 lbs.) in the MD and 151 N (34 lbs.) in the CD, and a mullen burst strength of 393 Pascal (57 psi.). This substrate was extrusion-coated with a polypropylene polymer composition containing about 50 percent by weight calcium carbonate filler. The polymer film was extruded onto the substrate at two different basis weights: 25 g/m² and 35 g/m². The resulting composite was incrementally stretched in the CD using equipment similar to that shown in FIG. 2. Samples of the fabric were taken at three locations across the width of the fabric, near the left, center, and near the right, and the physical properties of these samples were evaluated. Average values for the three samples are shown in Table 1 below.

TABLE 1

| Test | Sample 1 | Sample 2 |
|---|---|---|
| Film Basis Weight (g/m²) | 25 | 35 |
| Peel adhesion (g/1 inch) | 215 | Fiber tear |
| Hydrohead (cm) | >100 | >100 |
| Gurley Porosity | >400 | >400 |
| Thickness, mm (mils) | 0.055 (21.7) | 0.455 (17.9) |
| Grab Tensile, MD N (lbs). | 329 (74) | 369 (83) |
| Grab Tensile, CD N (lbs.) | 298 (67) | 302 (68) |
| Trap. Tear, MD N (lbs.) | 146 (32.8) | 170 (38.3) |
| Trap. Tear, CD N (lbs.) | 121 (27.2) | 126 (28.3) |

Example 2

Typar 3201, a spunbond polypropylene nonwoven fabric having a basis weight of 64 g/m² (1.9 oz/yd²), was extrusion coated as in Example 1, using a polypropylene with about 50 percent by weight calcium carbonate filler applied at a basis weight of 35 g/m². The fabric was incrementally stretched in the CD by passing through incremental stretching rollers set at 1.4 trim (55 mils) and at 1.5 mm (60 mils) engagement, respectively. Samples of the fabric were taken at three locations across the width of the fabric, near the left, center, and near the right, and the physical properties of these samples were evaluated. Average values for the three samples are shown in Table 2 below.

TABLE 2

| Test | Sample 3 | Sample 4 | Sample 5 |
|---|---|---|---|
| Stretch Roll setting mm (mils) | 1.4 (55) | 1.4 (55) | 1.5 (60) |
| Peel adhesion (g/1 inch) | Fiber tear | Fiber tear | Fiber tear |
| Hydrohead (cm) | >55 | >55 | >55 |
| Gurley Porosity | >400 | >400 | >400 |
| Thickness mm (mils) | 0.41 (16) | 0.43 (17) | 0.51 (20) |
| Grab Tensile, MD N (lbs.) | | 427 (96) | 489 (110) |
| Grab Tensile, CD N (lbs.) | | 325 (73) | 333 (74.8) |
| Trap. Tear, MD N (lbs.) | | 191 (42.9) | 144 (32.3) |
| Trap. Tear, CD N (lbs.) | | 114 (25.6) | 82.7 (18.6) |

Example 3

In this example, the tensile properties of several of the high tenacity spunbond nonwoven substrates used in the present invention (Typar®) are contrasted with commercially available spunbond nonwoven fabrics. In Table 3, Typar spunbond nonwoven fabric in three different basis weights is compared to a spunbond polypropylene fabric produced by a Reicofil spunbond process. The Typar nonwoven fabric is a spunbond nonwoven fabric formed from mechanically cold-drawn polypropylene filaments. In the nonwoven fabric produced by the Reicofil process, the polypropylene filaments are attenuated pneumatically by a slot draw attenuator located in the spinline directly beneath where the molten polymer filaments are extruded.

TABLE 3

| Product | Typar | Typar | Typar | Reicofil |
|---|---|---|---|---|
| Basis Weight g/m² (oz/yd²) | 57 (1.7) | 64 (1.9) | 78 (2.3) | 57 (1.7) |
| MD Grab Tensile N (lbs.) | 316 (71) | 365 (82) | 472 (106) | 160 (36) |
| CD Grab Tensile N (lbs.) | 294 (66) | 334 (75) | 436 (98) | 129 (29) |
| MD Trap Tear N (lbs.) | 151 (34) | 165 (37) | 178 (40) | |
| CD Trap Tear N (lbs.) | 138 (31) | 151 (34) | 147 (33) | |

Example 4

In Table 4 below, the tensile elongation of a 78 g/m² (2.3 oz/yd²) Typar nonwoven fabric substrate is compared with that of two lighter basis weight polypropylene spunbond nonwovens produced for hygiene applications using a slot-draw pneumatic attenuation process,

TABLE 4

| Product | Typar | Hygiene | Hygiene |
|---|---|---|---|
| Basis Weight (g/m²) | 78 | 30.5 | 27.1 |
| MD Strip Tensile Elongation (%) | 71 | 120 | 100 |
| CD Strip Tensile Elongation (%) | 59 | 190 | 175 |

Example 5

In Table 5, the birefringence and individual fiber tenacity are compared for a high tenacity Typar substrate and a conventional spunbond nonwoven for hygiene applications.

TABLE 5

Substrate Fiber Properties

| Sample Description | Application | Birefringence | Fiber Tenacity grams/denier |
|---|---|---|---|
| Typar Fibers - 10 dpf | Industrial | 0.026 | 3 |
| Typar Fibers - 20 dpf | Industrial | 0.025 | 3.8 |
| Spunbond Fibers - 2.7 dpf | Hygiene | 0.021 | 2 |

The following tables illustrate the properties of composite nonwoven fabrics in accordance with the present invention.

TABLE 6

Composite Physical Properties
Composite Tensile Strength
Composite Grab Tensiles

| Sample Description | MD Grab Tensile Strength N (lbs) | CD Grab Tensile Strength N (lbs) | Notes |
|---|---|---|---|
| Coated 64 g/m² Typar | 329 (74) | 267 (60) | ASTM Method D5034 |
| Coated 78 g/m² Typar | 480 (108) | 480 (108) | ASTM Method D1682 and D1117 Section 7 |

TABLE 7

Substrate Tensile Elongation
Strip Tensiles - ASTM Method D882

| Sample Description | MD Strip Tensile Elongation % | CD Strip Tensile Elongation % |
|---|---|---|
| Coated 64 g/m² Typar | 37 | 33 |
| Coated 78 g/m² Typar | 55 | 56 |

TABLE 8

Composite Trapezoidal Tear Strength
Trap Tear Tensiles

| Sample Description | MD Trap Tear Strength N | CD Trap Tear Strength N | Notes |
|---|---|---|---|
| Coated 64 g/m² Typar | 129 | 178 | ASTM Method D5733 |
| Coated 78 g/m² Typar | 120 | 173 | ASTM Method D1117 Section 14 |

TABLE 9

Composite Air Leakage Rate
Air Leakage Rate - ASTM E-283, at 75 Pa

| Sample Description | Air Leakage Rate ft³/min ft² | Notes |
|---|---|---|
| Coated 64 g/m² Typar | 0.0006 | Highest value measured at 75 Pa |

TABLE 10

| Composite Moisture Vapor Transmission Rate Moisture Vapor Transmission Rate - ASTM E96 - Procedure A | | |
|---|---|---|
| Sample Description | MVTR g/m²/24 hours | |
| Coated 64 g/m² Typar | 51 | |
| Coated 78 g/m² Typar | 132[1] | Test Duration: 5 hours |

[1] Average of 5 measurements

Many modifications and other embodiments of the invention will conic to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of preparing a composite sheet material having strength and barrier properties suitable for use as a housewrap, the method comprising:
    extrusion coating a polyolefin film layer onto a surface of an area-bonded, spunbond nonwoven substrate to form a composite sheet material, the composite sheet material having a grab tensile strength of at least 178 Newtons in at least one of the machine direction (MD) or the cross-machine direction (CD), and
    incrementally stretching the composite sheet material, wherein the stretching step comprises incrementally stretching the composite sheet material in at least one of the CD or the MD to form incrementally stretched zones separated by zones of substantially unstretched or less stretched material to impart to the composite sheet material a hydrostatic head of at least 100 cm, and a moisture vapor transmission rate (MVTR) of at least 35 g/m2/24 hr. at 50% relative humidity and 23° C.

2. The method according to claim 1, comprising passing the composite sheet material through a first pair of intermeshing rolls configured for achieving stretching in the cross-direction (CD) of the composite sheet material.

3. The method according to claim 1, comprising passing the composite sheet material through a second pair of intermeshing rolls configured for stretching in the machine direction (MD) of the composite sheet material.

4. The method according to claim 1, wherein the nonwoven substrate has basis weight of at least 50 g/m² and the composite sheet material has a grab tensile strength in both the machine direction (MD) and cross-machine direction (CD) of at least 178 Newtons.

5. The method according to claim 1, wherein the nonwoven substrate is formed from substantially continuous cold-drawn, molecularly oriented filaments.

6. The method according to claim 1, wherein the composite sheet material has a Gurley porosity of at least 400 seconds and a basis weight of from 60 to 140 g/m².

7. The method according to claim 1, wherein the polyolefin film layer extends uninterruptedly and continuously over the surface of the nonwoven substrate and is intimately bonded thereto to provide a peel adhesion of at least 150 grams per inch, the film layer comprising a polyolefin polymer and at least 40% by weight inorganic filler, the film layer having a basis weight of at least 25 g/m², and the film layer defining an outer surface of the composite sheet material.

8. The method according to claim 1, wherein the stretching step comprises stretching the composite sheet material in both the CD and the MD by incremental stretching to impart to the composite sheet material a moisture vapor transmission rate (MVTR) of at least 100 g/m²/24 hr at 50% relative humidity and 23° C.

* * * * *